United States Patent Office 2,861,934

Patented Nov. 25, 1958

2,861,934

METHOD FOR EFFECTING PHOTO-POLYMERIZATION

Roland J. Kern, Dayton, Ohio, assignor to Monsanto Chemical Company, St. Louis, Mo., a corporation of Delaware No Drawing. Application July 1, 1953
Serial No. 368,539

9 Claims. (Cl. 204—158)

This invention relates to photopolymerization of unsaturated organic compounds. In specific aspects, the invention pertains to new photosensitizers for the photopolymerization of acrylonitrile, styrene, vinyl acetate, and the lower alkyl acrylates and methacrylates.

The essence of this invention resides in the use of benzene thiols as sensitizers for photopolymerization. In accordance with preferred aspects of the invention one or more of the monomers acrylonitrile, styrene, vinyl acetate and the lower alkyl acrylates and methacrylates, is subjected to the polymerizing influence of light in the ultraviolet range while having dispersed in said monomer a small amount of a benzene thiol effective to photosensitize, i. e. speed-up, the polymerization. The benzene thiols employed according to the invention act to increase the rate of polymerization occurring under the influence of light in the ultraviolet range, and can be termed photosensitizers or photopolymerization catalysts. Preferably light containing effective amounts of light having wave lengths of 2,000 to 4,000 Angstrom units (A.) is used.

Benzene thiols to be used as photosensitizers in accordance with the invention include benzene thiol itself, e. g. thiophenol, and benzene thiols substituted with one or more groups that do not prevent the desired initiation of photopolymerization. Among groups that are usually non-interfering can be mentioned by way of example: alkyl, halogen, aryl, cycloalkyl, alkoxy. Particularly preferred groups are alkyl, phenyl, and a benzene ring condensed with the benzene ring of benzene thiol. Such alkyl, phenyl, or condensed benzene rings can themselves be further substituted. The following specific benzene thiols are mentioned by way of example: thiophenol (benzene thiol), p-thiocresol, o-thiocresol, o-aminobenzene thiol, o-tolylbenzene thiol, p-methoxybenzene thiol, diisopropylbenzene thiol, ortho-, meta-, and para-biphenylthiols (phenylbenzene thiols), naphthalene thiols, e. g. $\alpha$-naphthyl thiol, $\beta$-naphthyl thiol. Preferred compounds are benzene thiols wherein benzene thiol is substituted by electron-releasing groups, e. g. alkyl, alkoxy, in ortho- and para- positions. It is preferred that not over 2 carbon atoms of the benzene ring to which the —SH group is attached be substituted. Organic substituents should preferably contain from 1 to 6 carbon atoms.

The quantity of a benzene thiol to be used as photosensitizer will of course be dependent upon many variables, including the particular benzene thiol, the wave length of ultraviolet light employed, the intensity of light employed, the time or irradiation, the monomer or monomers present, and the temperature. In any event, the amount of benzene thiol photosensitizer is small, but sufficient is employed to be effective as a photosensitizer. This small but catalytic amount is usually within the range of from 0.01 to 5 weight percent based upon the amount of monomeric material initially present. It will seldom be necessary to employ more than 1 or 2 weight percent of the added photosensitizer and no more than 0.1 weight percent is in most instances sufficient to obtain a good polymerization rate. Conditions of temperature and pressure at which the photopolymerization is effected can be varied over a wide range. It will be understood that optimum conditions will be greatly dependent upon the particular monomeric material being polymerized. Many photopolymerizations are readily effected at temperatures of from 0° C. to 150° C. when the monomer is exposed to a light source rich in ultraviolet light. The present knowledge of the art on photopolymerizations is sufficient to permit choice of suitable operating conditions for any particular monomer, and simple tests can be run if necessary to determine the conditions most suitable for any particular system. At a given temperature, the practice of my invention makes possible a more rapid photopolymerization than is effected in the absence of my added photosensitizer.

Any suitable source of radiation providing wave lengths in the ultraviolet range, preferably within the range of 2,000 to 5,000 Angstrom units and still more preferably within the range of 2,000 to 4,000 A., can be used. Common sources include mercury lamps and arcs, carbon arcs and hydrogen discharge tubes. Of course, sunlight also contains substantial amounts of ultraviolet radiation and can be used if desired. Radiation of sufficient intensity from tungsten lamps can be employed. In any event, light within the ultraviolet range of sufficient intensity and for a sufficient time is used to effect the desired extent of polymerization, which can be very small, for example 1 percent of the monomer polymerized but which, for practical reasons, should be considerably larger.

The vessel in which the polymerization is conducted should be transparent to light of the desired wave length so that the light can pass through the sides of the container. Suitable glasses are available commercially, and include borosilicate ("Pyrex"), "Vycor," or soft glass. Alternatively, the source of light can be placed directly over the surface of the monomer in a container, or can be placed within the reaction mixture itself.

While the photopolymerization is usually conducted in mass, i. e. in a system wherein the only components of the reaction mixture are the monomer (or monomers) plus the benzene thiol photoinitiator (together with other polymerization initiators and catalysts if desired), the invention is more broadly applicable to all types of polymerization techniques. For example, an added organic solvent for monomer and/or polymer can be present, such as benzene, aliphatic hydrocarbons, ethanol, methanol. Further the polymerization can be effected by the well-known suspension and emulsion techniques. In the former the monomeric material, preferably already containing the benzene thiol compound chosen as photosensitizer, is suspended in the form of small particles in a non-solvent liquid, such as water, an added suspending agent such as starch, carboxymethylcellulose, phosphates, vinyl acetate/maleic anhydride copolymer, or the like being present to aid in maintaining the particles separate one from another; during the polymerization the particles tend to grow in size. Emulsion polymerization is similar with the exception that added emulsifying agents are used and the particle size is much smaller so that a stable aqueous emulsion of polymer is the end product of the polymerization. In this instance also it is preferred to dissolve the benzene thiol catalyst in the monomeric material prior to emulsifying the same. Suitable emulsifying agents are sodium or potassium fatty acid soaps, sodium alkaryl sulfonates, and non-ionic emulsifiers such as condensation products of ethylene oxide with tertiary alkyl mercaptans. It is generally preferred that free oxygen be absent during the polymerization.

In view of my discovery of the photosensitizing action of benzene thiols in photopolymerizations of a variety of unsaturated organic compounds, it will be apparent that the invention broadly covers the use of any benzene thiol effective to accelerate the polymerization of any monomeric material. There will, of course, be monomers and benzene thiols that are not effective, but those skilled in the art, having had the benefit of the present disclosure, can readily determine by obvious simple tests suitable monomers and benzene thiols to be employed. The preferred monomers are acrylonitrile, styrene, vinyl acetate, and the lower alkyl acrylates and methacrylates. By the term, "lower alkyl acrylates and methacrylates," I include for example methyl, ethyl, isopropyl, n-propyl, n-butyl, sec.-butyl, tert.-butyl, and the various amyl and hexyl acrylates, and the same methacrylates, in particular. However, other lower alkyl acrylates and methacrylates containing a greater number of carbon atoms, for example up to 8 or 10 carbon atoms, in the alkyl group, fall within the broad scope of the invention.

The monomeric material can be any monomeric material whose photopolymerization is accelerated by a benzene thiol. The monomeric material can be a single monomer or a mixture of monomers. Thus, the monomeric material preferably is one of the monomers specifically mentioned hereinabove or a mixture of monomers containing one or more of said monomers specifically mentioned hereinabove. Thus, the monomeric material can consist of a single monomer, e. g., styrene, or methyl methacrylate, in which case a homopolymer is formed. Or, a copolymer can be formed by subjecting to photopolymerization a mixture of monomers, e. g. styrene plus methyl methacrylate or styrene plus some other ethylenically unsaturated monomer copolymerizable therewith.

The purity of monomer may have a marked effect upon the polymerization rate. Thus, it is ordinarily preferred that the polymerization be effected with freshly distilled monomer, and also in the absence of air. Various benzene thiols will differ in the extent to which they are affected by monomer purity, choice of monomer, and conditions of reaction. The invention encompasses the use of those benzene thiols effective to photosensitize, i. e. increase the rate of the polymerization, of a given monomeric material of the class described herein under the influence of light in the ultraviolet range with a suitable combination of reaction conditions, including monomer purity and quantity of benzene thiol.

The following examples illustrate some preferred aspects of the invention but are not to be taken as exhaustive of the broad scope thereof.

EXAMPLES

Photopolymerization tests were made by sealing under nitrogen in a "Pyrex" glass tube 20 ml. of the chosen monomer, together with 0.02 gram of the chosen benzene thiol to be tested. With each monomer a blank was run in which the same quantity of monomer was sealed in the tube without any added benzene thiol. The tubes were equally irradiated by a General Electric B–H–4 ultraviolet lamp (a mercury vapor bulb giving light rich in the ultraviolet range) at a distance of 1 to 2 inches, the tubes being held at 40° C. to 45° C. during irradiation. The irradiation time was varied with the different monomers in accordance with previous experience indicating a desirable time for tests of this nature.

After the given polymerization period each tube was opened, the weighed contents precipitated in excess methanol, filtered, washed with methanol or hexane, dried and weighed again to determine the amount of polymer formed ,whereby the weight percent of monomer charged that had been converted to polymer was obtained. In some instances a quantitative separation and determination was not made where visual observation was sufficient to determine the effect of the added thiol on the polymerization.

*Example 1*

Acrylonitrile was subjected to photopolymerization in the manner described above for a period of 1 hour. At the end of this time the blank (tube containing nothing but acrylonitrile sealed under nitrogen) remained clear, no polymer had precipitated, and no increase in viscosity was evident. On the other hand, each of the tubes to which o-aminobenzene thiol, thiophenol, and p-thiocresol had been respectively added, contained large amounts of white solid polymer.

*Example 2*

Tests were made on vinyl acetate in the manner described above. No change whatsoever occurred in the blank. Vinyl acetate to which ortho-aminobenzene thiol had been added was irradiated for 14 hours; pouring the thus-treated sample into hexane gave no polymer precipitation. Thiophenol added to vinyl acetate caused an 80 weight percent conversion to polymer in 20 hours. Addition of para-thiocresol caused an 80 weight percent conversion to polymer in 10 hours. The polymer content of the samples was determined in the manner described hereinabove with the exception that hexane rather than methanol was used as the precipitating liquid.

*Example 3*

Tests on photopolymerization of styrene monomer were made as described above. The polymerization period was 20 hours. The weight percent conversion to polymer was determined in each case. Specific viscosity of each of the isolated polymers was determined as measurement of solution in the amount of 0.1 weight percent in toluene. These viscosities determinations showed that marked differences in polymer molecular weights were obtained, depending upon the particular benzene thiol used.

| Material | Conversion, Percent | Specific Viscosity 0.1% in Toluene |
|---|---|---|
| Blank | 10–12 | 0.206 |
| Thiophenol | 19 | .109 |
| p-Thiocresol | 17 | .102 |
| o-Aminobenzene thiol | 17 | .044 |

*Example 4*

The effect of benzene thiols on photopolymerization of methyl methacrylate was determined in the manner of the preceding examples, with the following results. The polymerization period was 5 hours for p-thiocresol, 7 hours for thiophenol and 9 hours for o-aminobenzene thiol.

| | Percent |
|---|---|
| Blank | 8 |
| Thiophenol | 78 |
| p-Thiocresol | 75 |
| o-Aminobenzene thiol | 0 |

*Example 5*

Similar tests were run on methyl acrylate. The polymerization period was 2 hours. The results were as follows:

| | Percent |
|---|---|
| Blank | 0 |
| Thiophenol | 95 |
| p-Thiocresol | 95 |
| o-Aminobenzene thiol | 0 |

A parallel test for longer periods of time, a blank and a sample containing ortho-aminobenzene thiol polymerized to about 60 percent conversion after 8 hours, the polymerization occurring quite suddenly.

While the invention has been described herein with particular reference to various preferred embodiments thereof, and examples have been given of suitable materials, proportions and conditions, it will be appreciated that variations from the details given herein can be effected without departing from the invention.

I claim:

1. In the photopolymerization of acrylonitrile, the improvement which comprises conducting said photopolymerization in the presence of a small amount of a photosensitizer consisting essentially of a benzene thiol effective to photosensitize said polymerization.

2. A process according to claim 1 wherein said benzene thiol is thiophenol.

3. A process according to claim 1 wherein said benzene thiol is p-thiocresol.

4. A process according to claim 1 wherein said benzene thiol is o-aminobenzene thiol.

5. A process which comprises polymerizing acrylonitrile under the influence of light in the ultraviolet range in the presence of a small amount of a photosensitizer consisting essentially of a benzene thiol effective to photosensitize said polymerization.

6. A process according to claim 5 wherein said benzene thiol is employed in an amount within the range of from 0.01 to 1.0 weight percent of the monomer.

7. A process according to claim 5 wherein said light includes radiation within the range of 2,000 to 4,000 Angstrom units.

8. A process which comprises admixing with a monomeric material comprising acrylonitrile a small but effective amount less than 1 weight percent of a photosensitizer consisting essentially of a benzene thiol effective as photopolymerization sensitizer for said monomeric material, and subjecting the resulting admixture to the photopolymerizing effect of radiation within the range of from 2,000 to 4,000 Angstrom units of sufficient intensity for a sufficient time to polymerize at least a portion of said monomeric material.

9. A process according to claim 8 wherein said benzene thiol is thiophenol.

References Cited in the file of this patent

UNITED STATES PATENTS 2,383,319 Kharasch ---------------- Aug. 21, 1945

FOREIGN PATENTS 654,026 Great Britain ------------ May 30, 1951